United States Patent
Yoon

(10) Patent No.: US 10,554,055 B2
(45) Date of Patent: Feb. 4, 2020

(54) BATTERY SYSTEM AND METHOD FOR CONTROLLING THE SAME

(71) Applicants: HYUNDAI MOTOR COMPANY, Seoul (KR); KIA MOTORS CORPORATION, Seoul (KR)

(72) Inventor: Jong Seo Yoon, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 153 days.

(21) Appl. No.: 15/668,800

(22) Filed: Aug. 4, 2017

(65) Prior Publication Data

US 2018/0170205 A1 Jun. 21, 2018

(30) Foreign Application Priority Data

Dec. 15, 2016 (KR) .................... 10-2016-0172007

(51) Int. Cl.
*H02J 7/00* (2006.01)
*B60L 58/22* (2019.01)
(Continued)

(52) U.S. Cl.
CPC ............ *H02J 7/0019* (2013.01); *B60L 58/12* (2019.02); *B60L 58/20* (2019.02); *B60L 58/22* (2019.02);
(Continued)

(58) Field of Classification Search
CPC ...... B60L 11/1866; B60L 58/22; B60L 58/12; B60L 7/0019; B60L 7/0021;
(Continued)

(56) References Cited

U.S. PATENT DOCUMENTS

2009/0047438 A1* 2/2009 Kawata ................. B29B 7/7438
427/426
2012/0286794 A1* 11/2012 Firehammer ......... H02J 7/0016
324/434
(Continued)

FOREIGN PATENT DOCUMENTS

KR 1020120059247 A 6/2012
KR 1020140131171 A 11/2014

*Primary Examiner* — Amanda C. Walke
(74) *Attorney, Agent, or Firm* — Lempia Summerfield Katz LLC

(57) ABSTRACT

A battery system includes a battery unit and a controller. The battery unit has a plurality of battery modules, a plurality of first relays and a plurality of second relays. Each battery module has a plurality of unit cells that are connected in series. The plurality of first relays are connected between the same polarity terminals between the plurality of battery modules and configured to allow parallel connection between the plurality of battery modules upon being closed. The plurality of second relays are connected between different-polarity terminals of the plurality of battery modules and configured to allow series connection between the plurality of battery modules upon being closed. The controller of the battery system is configured to control the closed/open state of the plurality of first relays and the plurality of second relays based on a voltage deviation between the plurality of battery modules.

4 Claims, 3 Drawing Sheets

(51) Int. Cl.
*B60L 58/12* (2019.01)
*B60L 58/20* (2019.01)

(52) U.S. Cl.
CPC .......... *H02J 7/0021* (2013.01); *H02J 7/0024* (2013.01); *B60L 2240/12* (2013.01); *B60L 2240/547* (2013.01); *Y02T 10/7005* (2013.01); *Y02T 10/7044* (2013.01); *Y02T 10/7061* (2013.01)

(58) Field of Classification Search
CPC ............. B60L 7/0024; H01M 10/4207; H01M 10/425; H01M 10/441; H01M 2010/4271
USPC ....................................................... 429/112
See application file for complete search history.

(56) References Cited

U.S. PATENT DOCUMENTS

| | | | |
|---|---|---|---|
| 2013/0119938 A1* | 5/2013 | Ma | H02J 7/0016 320/134 |
| 2016/0046200 A1* | 2/2016 | Timmons | B60L 11/1855 318/139 |
| 2016/0294198 A1* | 10/2016 | Poulis | H01M 10/441 |
| 2016/0336623 A1* | 11/2016 | Nayar | H01M 4/38 |
| 2017/0308110 A1* | 10/2017 | Ahmed | G05F 1/67 |
| 2017/0310128 A1* | 10/2017 | Cheng | H02J 7/00 |
| 2018/0041052 A1* | 2/2018 | Nakamoto | H02J 7/0026 |
| 2018/0138486 A1* | 5/2018 | Wyatt | B60L 58/20 |
| 2018/0212441 A1* | 7/2018 | Hsieh | H02J 7/0016 |
| 2018/0366712 A1* | 12/2018 | Wyatt | B60L 58/20 |

* cited by examiner

BATTERY SYSTEM AND METHOD FOR CONTROLLING THE SAME

CROSS-REFERENCE TO RELATED APPLICATION

This application claims the priority benefit of Korean Patent Application No. 10-2016-0172007, filed on Dec. 15, 2016 in the Korean Intellectual Property Office, the disclosure of which is incorporated herein by reference.

BACKGROUND

1. Field of the Disclosure

The present disclosure relates to a battery system and to a method for controlling the battery system.

2. Description of the Related Art

In general, a battery includes a plurality of unit cells that are connected in series. A voltage balancing circuit for removing a voltage deviation between the unit cells to maximize battery performance may be applied to the battery.

As a conventional voltage balancing approach, the passive method consumes energy of a unit cell with a higher voltage than a voltage of another unit cell with a lowest voltage among a plurality of unit cells that are connected in series. Another voltage balancing approach, the active method, removes a voltage deviation by transferring charge from one cell to another unit cell with a lower voltage.

The voltage balancing approach using the passive method consumes electric energy stored in a unit cell as thermal energy through a resistor. Thus, there are problems with this method since a battery state of charge (SoC) and the output of the battery are reduced after balancing is performed. Additionally, balancing takes a long time due to a low energy consumption through the resistor.

In addition, the voltage balancing approach using the active method requires charging in a cell unit. Thus, there are problems with this method in terms of a complicated circuit configuration and high expenses for balancing.

The matters disclosed in this section are merely for enhancement of understanding of the general background of the disclosure and should not be taken as an acknowledgment or any form of suggestion that the matters form the related art already known to a person skilled in the art.

SUMMARY

Therefore, the present disclosure has been made in view of the above-described problems. It is an object of the present disclosure to provide a battery system to maximize the effect of voltage balancing of a battery including a plurality of unit cells. It is another object of the present disclosure to provide a method of controlling the battery system.

In accordance with an aspect of the present disclosure, the above and other objects can be accomplished by the provision of a battery system which includes a battery unit. The battery unit includes a plurality of battery modules and each battery module includes a plurality of unit cells that are connected in series. The battery unit further includes a plurality of first relays connected between the same polarity terminals between the plurality of battery modules. The plurality of first relays are configured to allow parallel connection between the plurality of battery modules when the first relays are closed. The battery unit also includes a plurality of second relays connected between different-polarity terminals of the plurality of battery modules. The plurality of second relays are configured to allow a series connection between the plurality of battery modules when the second relays are closed. The battery system further includes a controller configured to control a closed/open state of the plurality of first relays and the plurality of second relays based on a voltage deviation between the plurality of battery modules.

The controller may calculate a voltage deviation between a voltage of a battery module with a highest voltage and a voltage of a battery module with a lowest voltage among the plurality of battery modules.

The controller may calculate a voltage deviation for every two battery modules, terminals of which are connected directly to two contact points of one of the plurality of first relays of the plurality of battery modules.

When the voltage deviation is greater than a preset reference value, the controller may perform voltage balancing via energy movement between two battery modules by opening the plurality of second relays and sequentially closing relays between two battery modules for every two battery modules, terminals of which are connected directly to two contact points of one of the plurality of first relays of the plurality of battery modules.

The battery system may further include a cell balancing unit configured to perform passive voltage balancing between a plurality of unit cells included in the plurality of battery modules according to a voltage deviation between a plurality of unit cells included in the plurality of battery modules.

The controller may perform voltage balancing between the plurality of battery modules by selectively closing the plurality of first relays and opening the plurality of second relays based on a voltage deviation between the plurality of battery modules. Then the controller may perform passive voltage balancing between a plurality of unit cells included in the plurality of battery modules when a voltage deviation between the plurality of unit cells included in the plurality of battery modules is greater than a preset reference value.

In accordance with another aspect of the present disclosure, the above and other objects can be accomplished by the provision of a method of controlling the battery system. The method includes checking a voltage deviation between the plurality of battery modules by the controller. When a voltage deviation between the plurality of battery modules is greater than a preset reference value, the method further includes performing voltage balancing via energy movement between the battery modules by controlling the plurality of first relays to be selectively closed and controlling the plurality of second relays to be opened. The controlling is performed by the controller.

The checking may include calculating a voltage deviation between a voltage of a battery module with a highest voltage and a voltage of a battery module with a lowest voltage among the plurality of battery modules. The checking may be performed by the controller.

The checking may include calculating a voltage deviation for every two battery modules, terminals of which are connected directly to two contact points of one of the plurality of first relays of the plurality of battery modules. The checking may be performed by the controller.

The performing may include, when the voltage deviation is greater than a preset reference value, performing voltage balancing via energy movement between two battery modules by opening the plurality of second relays and sequentially closing relays between two battery modules every two battery modules, terminals of which are connected directly to two contact points of one of the plurality of first relays of the plurality of battery modules. The performing may be performed by the controller.

The method may further include, after the performing, controlling a cell balancing unit configured to perform passive voltage balancing between a plurality of unit cells included in the plurality of battery units according to a voltage deviation between a plurality of unit cells included in the plurality of battery modules and performing passive voltage balancing between the plurality of unit cells included in the plurality of battery modules. The controlling and the performing may be performed by the controller.

The battery unit may be installed in a vehicle driven by a motor and may be connected to a high-voltage direct current (DC) link during vehicle driving. The checking and the performing may be performed after the vehicle begins to be turned on and before the battery unit and the high-voltage DC link are electrically connected.

The battery unit may be installed in a vehicle driven by a motor and may be connected to a high-voltage direct current (DC) link during vehicle driving. The checking and the performing may be performed when a vehicle speed of the vehicle is equal to or less than a preset level during vehicle driving or when a vehicle transmission of the vehicle is in neutral and a current output from the battery unit is equal to or less than a preset level.

The battery unit may be installed in a vehicle driven by a motor and may be connected to a high-voltage direct current (DC) link during vehicle driving. The checking and the performing may be performed after vehicle driving is terminated and the battery unit and the high-voltage DC link are electrically disconnected.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, a battery system and a method of controlling the battery system according to embodiments of the present disclosure are described with reference to the accompanying drawings.

Figure 1:
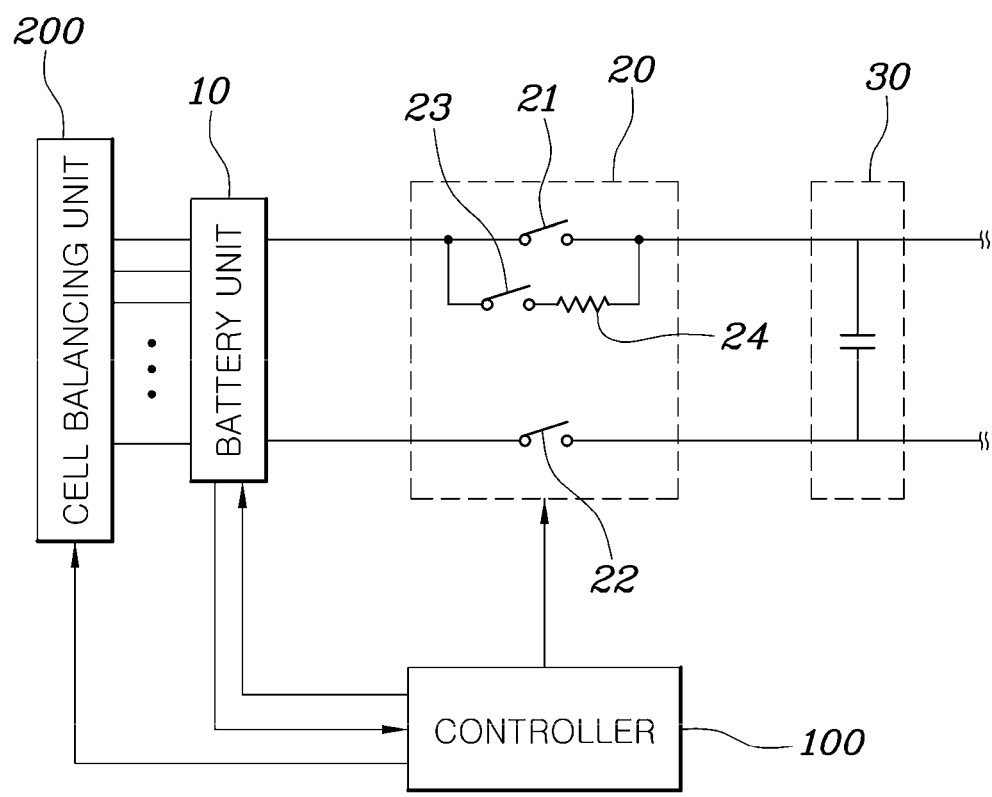
FIG. 1 is a diagram illustrating a structure of a battery system according to an embodiment of the present disclosure.

FIG. 1 is a diagram illustrating a structure of a battery system according to an embodiment of the present disclosure.

Referring to FIG. 1, the battery system according to an embodiment of the present disclosure may broadly include a battery unit 10 and a controller 100.

The battery unit 10 may be a device for storing electric energy and may be used to store driving power of a motor of a vehicle when the battery system is applied to the vehicle. According to various embodiments of the present disclosure, the battery unit 10 may include a plurality of unit cells that are each a minimum unit for storing energy and a predetermined number of unit cells may be grouped to constitute a module. The battery unit 10 may also include a plurality of battery modules that are electrically connected via a relay.

Figure 2:
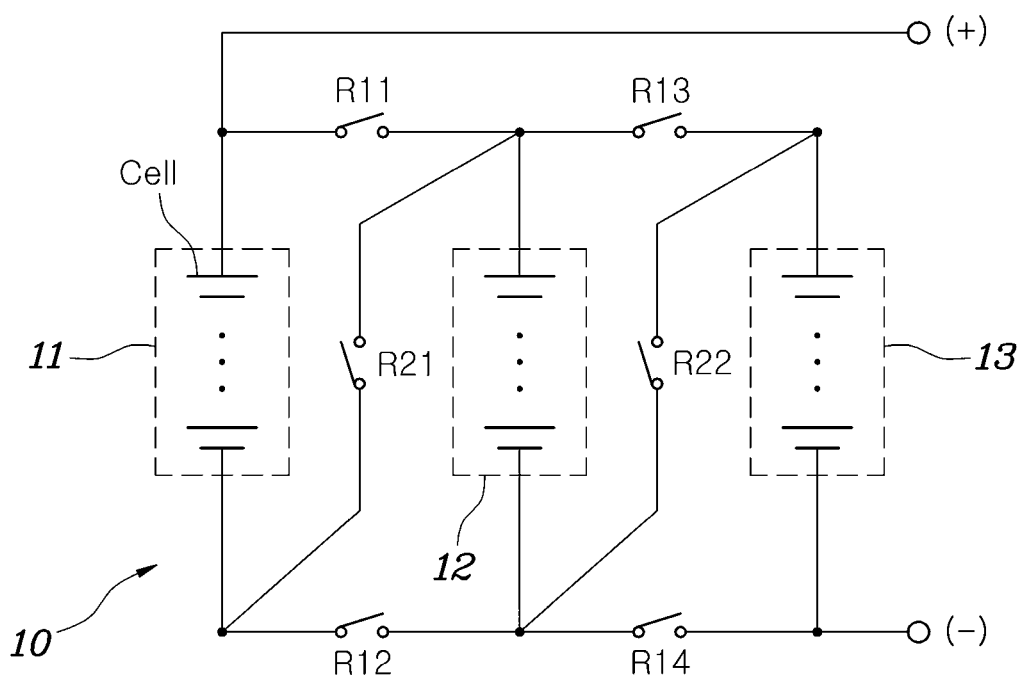
FIG. 2 is a diagram illustrating a battery unit of a battery system in detail according to an embodiment of the present disclosure.

FIG. 2 is a diagram illustrating the battery unit 10 of a battery system in detail according to an embodiment of the present disclosure.

Referring to FIG. 2, the battery unit 10 may include a plurality of battery modules 11, 12, and 13 that each include a plurality of unit cells that are connected in series. The battery unit may further include a plurality of first relays R11, R12, R13, and R14 that are connected between the same-polarity terminals of the plurality of battery modules 11, 12, and 13 and that allow parallel connection between the plurality of battery modules 11, 12, and 13 upon the first relays being closed, i.e., in a closed state. The battery unit further may further include a plurality of second relays R21 and R22 that are connected between different-polarity terminals of the plurality of battery modules 11, 12, and 13 and that allow series connection between the plurality of battery modules 11, 12, and 13 upon the second relays being closed, i.e., in a closed state.

Although FIG. 2 illustrates an example in which the battery unit 10 includes the three battery modules 11, 12, and 13, the number of the battery modules 11, 12, and 13 may be determined in various ways, for example, 2, 4, or more, and thus the number of battery modules may vary.

According to various embodiments of the present disclosure, a closed/open state of the relays R11-R14, R21, and R22 in the battery unit 10 may be controlled by the controller 100. For example, when the relays R11, R12, R13, and R14 are closed and the relays R21 and R22 are opened, each of the battery modules 11, 12, and 13 may be electrically connected in parallel. When the relays R11, R12, R13, and R14 are opened and the relays R21 and R22 are closed, each of the battery modules 11, 12, and 13 may be electrically connected in series. When the battery unit 10 is applied to a vehicle, during vehicle driving, the relays R11, R12, R13, and R14 may be opened and the relays R21 and R22 may be closed so as to use a voltage obtained by summing voltages of all the battery modules 11, 12, and 13 to drive the vehicle. When the voltage balancing between the battery modules, which is described below, is performed, the relays R21 and R22 may be opened and the relays R11, R12, R13, and R14 may be selectively closed to perform voltage balancing between two adjacent battery modules.

The controller 100 may control a closed/open state of the relays R11-R14, R21, and R22 in the battery unit 10. Voltage balancing between unit cells included in each of the battery modules 11, 12, and 13 may be performed through an operation of a cell balancing unit 200, which is also described below. The controller 100 may control a closed/open state of the relays R11-R14, R21, and R22 and an operation of the cell balancing unit 200 in consideration of a driving state of a vehicle to which the battery unit 10 is applied.

FIG. 1 illustrates an example in which the battery unit 10 is applied to a vehicle. A reference numeral '20' refers to a power relay assembly (PRA) for forming/blocking electrical connection between the battery unit 10 with a high voltage and a high-voltage direct current (DC) link 30.

The PRA 20 may include a first main relay 21, opposite ends of which are directly connected to a positive (+) terminal of the battery unit 10 and one end of a DC link capacitor C of the high-voltage DC link 30, respectively. The PRA 20 may also include a second main relay 22, opposite ends of which are directly connected to a negative (−) terminal of the battery unit 10 and the other end of the DC link capacitor C, respectively. The PRA 20 may also include a precharge relay 23 connected between a positive (+) terminal of the battery unit 10 and one end of a high-voltage DC link capacitor using a resistor 24 as a medium. Although FIG. 1 illustrates the case in which the precharge relay 23 is connected to a positive (+) terminal of the battery unit 10, the precharge relay 23 may be connected to a negative (−) terminal of the battery unit 10 in another example.

When a vehicle begins to be turned on, the controller 100 may control the precharge relay 23 and the second main relay 22 to be closed. A voltage that is dropped by the resistor 24 may be applied to the DC link capacitor C to recharge the DC link capacitor C. When the DC link capacitor C is completely recharged and maintains a predetermined voltage, the controller 100 may open the precharge relay 23 and close the first main relay 21 so as to apply a voltage of the battery unit 10 to the high-voltage DC link 30. Such control may be performed to prevent over-current from flowing and damaging the DC link capacitor C when the first main relay 11 and the second main relay 12 are closed such that a high voltage of the battery unit 10 is applied directly to the DC link capacitor C while the vehicle is turned on.

According to an embodiment of the present disclosure, the battery system may further include the cell balancing unit 200 for voltage balancing between unit cells included in each of the battery modules 11, 12, and 13 included in the battery unit 10. The cell balancing unit 200 may be controlled by the controller 100 and may perform passive balancing for consuming power of a unit cell through a resistor to correspond to a voltage of another unit cell with a lowest voltage among the unit cells in the battery modules 11, 12, and 13 using a resistor and a switch that are connected in parallel to unit cells in each of the battery modules 11, 12, and 13. Since the passive balancing method is well known to one of ordinary skill in the art, a detailed description thereof will be omitted here.

Figure 3:
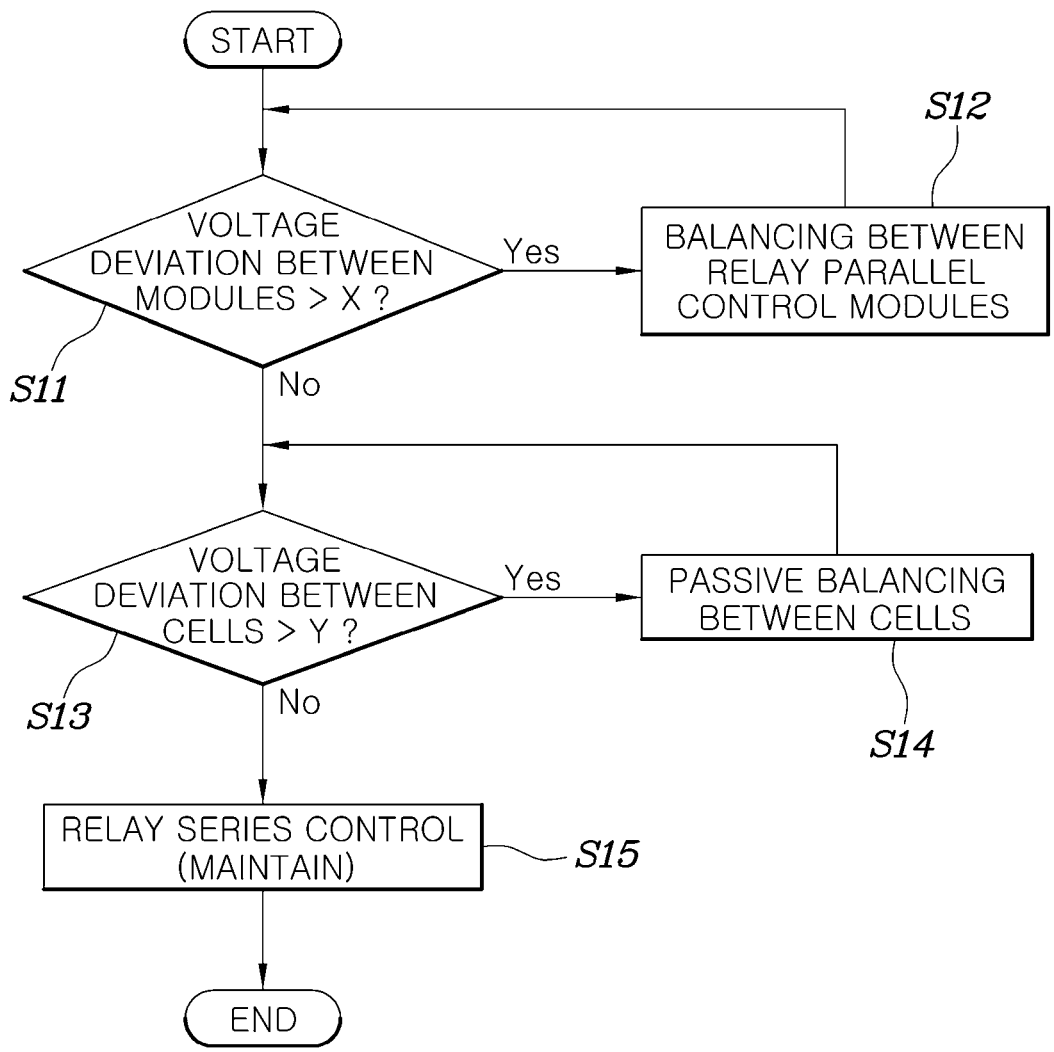
FIG. 3 is a flowchart of a method of controlling a battery system according to an embodiment of the present disclosure.

FIG. 3 is a flowchart of a method of controlling a battery system according to an embodiment of the present disclosure. The method of controlling the battery system according to an embodiment of the present disclosure, which is performed through FIG. 3, is described below to facilitate understanding of an operation and effect of the battery system according to an embodiment of the present disclosure.

As illustrated in FIG. 3, the method of controlling the battery system according to an embodiment of the present disclosure may be initiated from operation S11 of checking a voltage deviation between the battery modules 11, 12, and 13 included in the battery unit 10.

In operation S11, the controller 100 may detect each voltage of the plurality of battery modules 11, 12, and 13 included in the battery unit 10. The controller 100 may check whether a voltage deviation between the plurality of battery modules 11, 12, and 13 is greater than a preset reference value X to check whether voltage balancing between the plurality of battery modules 11, 12, and 13 is required.

The checking of the voltage deviation in operation S11 may be performed for every two battery modules, terminals of which are directly connected to two contact points of the relays R11-R14 for parallel connection. In other words, as shown in FIG. 1 and FIG. 2, the controller 100 may check a voltage deviation between the battery module 11 and the battery module 12 and a voltage deviation between the battery module 12 and the battery module 13. In operation S11, the controller 100 may also check a voltage deviation between a voltage of a battery module with a highest voltage and a voltage of a battery module with a lowest voltage among all the battery modules 11, 12, and 13.

In operation S11, upon determining that a voltage deviation between the battery modules 11, 12, and 13 is greater than a preset reference value, the controller 100 may control the relays R11-R14 to be closed in order to form a parallel connection between the battery modules 11, 12, and 13. The controller may then control the relays R21 and R22 to be opened in order to form a series connection to perform voltage balancing between the battery modules 11, 12, and 13 in operation S12.

For example, when a voltage deviation between the battery module 11 and the battery module 12 is greater than a preset value, the controller 100 may perform voltage balancing between the two battery modules 11 and 12 by closing the relays R11 and R12 to connect the battery module 11 and the battery module 12 in parallel and to recharge a battery module with a lower voltage with energy stored in a battery module with a higher voltage. Then, when a voltage deviation between the battery module 12 and the battery module 13 is greater than a preset value, the controller 100 may perform voltage balancing between the two battery modules 12 and 13 by closing the relays R13 and R14 to connect the battery module 12 and the battery module 13 in parallel and to recharge a battery module with a lower voltage with energy stored in a battery module with a higher voltage. When a voltage deviation between a voltage of a battery module with a highest voltage and a voltage of a battery module with a lowest voltage among all the battery modules 11, 12, and 13 is greater than a reference value, the controller 100 may sequentially perform voltage balancing between two battery modules, terminals of which are directly connected by the relays R11 to R14 for parallel connection.

When such voltage balancing between the battery modules 11, 12, and 13 is terminated, the controller 100 may check a voltage deviation between the unit cells included in each of the battery modules 11, 12, and 13 in operation S13. In operation S13, the controller 100 may determine whether a voltage deviation between a voltage of a unit cell with a highest voltage and a voltage of a unit cell with a lowest voltage among the unit cells included in one battery module is greater than a preset reference value Y.

The controller 100 may then control the cell balancing unit 200 to perform passive voltage balancing of the unit cells included in the corresponding one of the battery modules 11, 12, and 13 in which a voltage deviation of the unit cells is determined to be greater than the preset reference value Y in operation S14.

When the inter-cell passive balancing of operation S14 is terminated, the controller 100 may control the relays R21 and R22 to be closed for a series connection. The controller 100 may further control the relays R11-R14 to be opened for a parallel connection in order to output a voltage desired by the battery unit 10. When a voltage deviation between the battery modules 11, 12, and 13 is determined to be smaller than a preset reference value X in operation S11 and voltage balancing between the battery modules 11, 12, and 13 in operation S12 is not performed, the relays R11-R14 for parallel connection are not controlled to be closed. Thus, in operation S15, the relays R21 and R22 may be maintained to be closed for a series connection and the relays R11-R14 may be maintained to be opened for a parallel connection.

When a battery system is applied to a vehicle, the aforementioned method of controlling the battery system according to an embodiment of the present disclosure may be performed before the vehicle begins to be turned on and an operation of the PRA 20 for connecting the battery unit 10 and the high-voltage DC link 30 is initiated. The method of controlling the battery system may also be performed after vehicle driving is terminated and the main relays of the PRA 20 are opened. In addition, the method of controlling the battery system according to an embodiment of the present disclosure may be performed when a vehicle speed of the vehicle is equal to or less than a preset level during vehicle driving or when a vehicle transmission of the vehicle is in neutral and a current output from the battery unit 10 is equal to or less than a preset level.

As described above, in the battery system and the method of controlling the battery system according to various embodiments of the present disclosure, a voltage deviation between battery modules may be minimized via voltage balancing between a plurality of battery modules included in a battery unit. Voltage balancing is performed via energy exchange between battery modules. Thus, discharge energy may be reduced via voltage balancing compared with passive voltage balancing for consuming a voltage of a unit cell.

In the battery system and the method of controlling the battery system according to various embodiments of the present disclosure, voltage balancing between a plurality of battery modules and balancing between a plurality of unit cells included in the battery module may be integrated to maximize battery performance and durability.

In the battery system and the method of controlling the battery system according to various embodiments of the present disclosure, voltage balancing between a plurality of battery modules may be performed such that energy of a battery module that stores relatively sufficient energy is moved to a battery module that stores relatively insufficient energy. Then passive voltage balancing between a plurality of unit cells is performed to minimize power consumption according to passive voltage balancing.

In addition, in the battery system and the method of controlling the battery system according to various embodiments of the present disclosure, even if a circuit for passive voltage balancing between a plurality of unit cells malfunctions, a unit cell voltage deviation that is equal to or greater than a preset level may be removed via voltage balancing between battery modules.

As is apparent from the above description, according to the disclosed battery system and the method of controlling the battery system, a voltage deviation between a plurality of battery modules may be minimized via voltage balancing between a plurality of battery modules included in a battery unit, and the voltage balancing is performed via energy exchange between battery modules. Thus, discharge energy may be reduced via voltage balancing compared with passive voltage balancing for consuming a voltage of a unit cell.

According to the disclosed battery system and the method of controlling the battery system, voltage balancing between battery modules and balancing between unit cells included in the battery module may be integrated to maximize battery performance and durability.

According to the disclosed battery system and the method of controlling the battery system, voltage balancing between a plurality of battery modules may be performed such that energy of a battery module that stores relatively sufficient energy is moved to a battery module that stores relatively insufficient energy. Then passive voltage balancing between a plurality of unit cells is performed to minimize power consumption according to passive voltage balancing.

According to the disclosed battery system and the method of controlling the battery system, even if a circuit for passive voltage balancing between a plurality of unit cells malfunctions, a unit cell voltage deviation that is equal to or greater than a preset level may be removed via voltage balancing between a plurality of battery modules.

Although the embodiments of the present disclosure have been described above with reference to the accompanying drawings, those skilled in the art will appreciate that the present disclosure can be implemented in various other embodiments without changing the technical ideas or features thereof.

What is claimed is:

1. A battery system comprising:
   a battery unit having
   a plurality of battery modules each having a plurality of unit cells that are connected in series,
   a plurality of first relays connected between same polarity terminals between the plurality of battery modules and wherein the plurality of first relays is configured to allow parallel connection between the plurality of battery modules upon being closed, and
   a plurality of second relays connected between different-polarity terminals of the plurality of battery modules and wherein the plurality of second relays is configured to allow series connection between the plurality of battery modules upon being closed;
   a controller configured to control a closed/open state of the plurality of first relays and the plurality of second relays based on a voltage deviation between the plurality of battery modules; and
   a cell balancing unit configured to perform passive voltage balancing between a plurality of unit cells included in the plurality of battery modules according to a voltage deviation between a plurality of unit cells included in the plurality of battery modules,
   wherein the controller performs voltage balancing between the plurality of battery modules by selectively closing the plurality of first relays and opening the plurality of second relays based on a voltage deviation between the plurality of battery modules and, then performs passive voltage balancing between a plurality of unit cells included in the plurality of battery modules when a voltage deviation between the plurality of unit cells included in the plurality of battery modules is greater than a preset reference value.

2. The battery system according to claim 1, wherein the controller calculates a voltage deviation between a voltage of a battery module with a highest voltage and a voltage of a battery module with a lowest voltage among the plurality of battery modules.

3. The battery system according to claim 1, wherein the controller calculates a voltage deviation for every two battery modules, terminals of which are connected directly to two contact points of one of the plurality of first relays of the plurality of battery modules.

4. The battery system according to claim 1, wherein, when the voltage deviation is greater than a preset reference value, the controller performs voltage balancing via energy movement between two battery modules by opening the plurality of second relays and sequentially closing relays between two battery modules for every two battery modules, terminals of which are connected directly to two contact points of one of the plurality of first relays of the plurality of battery modules.

\* \* \* \* \*